UNITED STATES PATENT OFFICE.

CHARLES TAYLOR, RODERICK IMPEY MURCHISON, AND GEORGE SHARPE, OF MELBOURNE, VICTORIA.

COMPOSITION FOR PRESERVING TIMBER, &c.

SPECIFICATION forming part of Letters Patent No. 391,209, dated October 16, 1888.

Application filed September 14, 1888. Serial No. 285,394. (No specimens.) Patented in Victoria May 31, 1887, No. 5,094.

*To all whom it may concern:*

Be it known that we, CHARLES TAYLOR, RODERICK IMPEY MURCHISON, and GEORGE SHARPE, all subjects of the Queen of Great Britain, residing at No. 30 King street, Melbourne, in the British Colony of Victoria, importers, have invented a new Composition for Destroying Weeds, Scrub, and other vegetable growths, and for Destroying Insects and Preserving Timber from their attacks, (for which we have obtained Letters Patent in the British Colony of Victoria, patent dated the 31st day of May, 1887, and numbered 5,094, and for which applications for patents have been filed in the following British colonies, viz: Tasmania, application filed on the 22d day of May, 1888, and numbered 579—that under the laws governing the grant of patents in said colony the Letters Patent will bear date as of the day of filing, and that up to the present time the patent on said application filed in said colony has not been granted; New Zealand, application filed on the 13th day of May, 1888, and numbered 3,013—that under the laws governing the grant of patents in said colony the Letters Patent will bear date as of the day of filing, and that up to the present time the patent on said application filed in said colony has not been granted; South Australia, application filed the 22d day of May, 1888, but unnumbered—that under the laws governing the grant of patents in said colony the Letters Patent will bear date as of the day of filing, and that up to the present time the patent on said application filed in said colony has not been granted, and therefore the number thereof cannot be given; Queensland, application filed on the 23d day of May, 1888, but unnumbered—that under the laws governing the grant of patents in said colony the Letters Patent will bear date as of the day of issue, but the term of the patent will commence as of the day of filing, and that up to the present time the patent on said application filed in said colony has not been granted, and therefore the number thereof cannot be given; and that an application for Letters of Registration in Western Australia was sent for filing on the 25th day of June, 1888,) of which the following is a specification.

This invention has been designed for the purpose of providing an effective means of destroying weeds, scrub, and other vegetable growths, and for destroying insects and preserving timber from their attacks.

This composition is prepared in the following manner, viz: to three ounces of arsenic we add one ounce of sulphate of copper, one ounce of caustic soda, half an ounce of saltpeter, half an ounce of sulphur, and half an ounce sal-ammoniac, which we grind together into a powder and thoroughly intermix them. This is our new composition, although the precise proportions of the several ingredients may be altered or varied. Nevertheless we believe the proportions we have stated to be the best. The absolutely essential ingredients are the arsenic, the caustic soda, the saltpeter, and the sal-ammoniac. The sulphate of copper assists these, but is not indispensable. The caustic soda we use as a dissolvent, and the saltpeter and sulphur as vehicles. These, therefore, may be substituted by others of an equivalent character, although we know of no others that would answer the purpose.

In using our solution it is necessary that it should be dissolved in water, thus: For destroying eucalyptus scrub, ferns of all kinds, briers, furze, Californian thistle, &c., and for destroying white ants and other insects, and for preserving timber from their attacks, we take ten pounds of the material and add to it ten gallons of water, which we then boil slowly for twenty minutes, stirring it occasionally, and then add twenty gallons of cold water to make the quantity thirty gallons. For destroying cape-weed, sorrel, barr, &c., we make a solution of one-half the above strength—*i. e.,* ten pounds of the material to sixty gallons of water. It is better to keep stirring while boiling, and also to stir frequently while using, so as to secure a uniform strength, by which means the most satisfactory result is obtained. When the solution is thus prepared, it should be thoroughly sprinkled over the scrub or weeds by means of a suitable utensil, such as a common garden watering-pot or a tank on wheels.

When the ferns or briers are large, the better way is to cut them down and sprinkle the mixture over the newly-cut stems; or to allow them to grow again to the height of about six inches and then to apply the mixture. This latter way is very effectual. For eucalyptus scrub it is better to cut them down close to the ground and sprinkle the liquid over the newly-cut stems.

For destroying white ants and other insects in timber and for preserving timber from their attacks, we either paint, dip, or spray the timber with the liquid.

Having now particularly described and ascertained the nature of our said invention and in what manner the same is to be performed, we declare that what we claim is—

The new composition herein described for destroying weeds, scrub, and other vegetable growths, and for destroying insects and preserving timber from their attacks, consisting, mainly, in the combination of arsenic, caustic soda, sal-ammoniac, and saltpeter, substantially as herein described and explained.

CHARLES TAYLOR.
RODERICK IMPEY MURCHISON.
GEORGE SHARPE.

Witnesses:
WALTER SMYTHE BAYSTON,
WALTER CHARLES HART.